(12) United States Patent
Yu et al.

(10) Patent No.: US 12,305,889 B2
(45) Date of Patent: May 20, 2025

(54) LIGHT-CONCENTRATING ANTI-FROST ANTI-HEAVE HEAT GATHERING DEVICE AND SUBGRADE THEREOF

(71) Applicant: Northwest Institute of Eco-Environment and Resources, Chinese Academy of Sciences, Gansu (CN)

(72) Inventors: Qihao Yu, Gansu (CN); Zhenyu Zhang, Gansu (CN); Yanhui You, Gansu (CN)

(73) Assignee: NORTHWEST INSTITUTE OF ECO-ENVIRONMENT AND RESOURCES, CHINESE ACADEMY OF SCIENCES, Gansu (CN)

( * ) Notice: Subject to any disclaimer, the term of this patent is extended or adjusted under 35 U.S.C. 154(b) by 446 days.

(21) Appl. No.: 17/584,977

(22) Filed: Jan. 26, 2022

(65) Prior Publication Data
US 2022/0307729 A1    Sep. 29, 2022

(30) Foreign Application Priority Data
Mar. 25, 2021    (CN) .......................... 202110321517.0

(51) Int. Cl.
*F24S 20/64*    (2018.01)
*E01B 13/00*    (2006.01)
(Continued)

(52) U.S. Cl.
CPC .............. *F24S 20/64* (2018.05); *E01B 13/00* (2013.01); *F24S 23/31* (2018.05);
(Continued)

(58) Field of Classification Search
None
See application file for complete search history.

(56) References Cited

U.S. PATENT DOCUMENTS 3,217,791 A * 11/1965 Long ...................... E02D 3/115
165/45
4,067,315 A * 1/1978 Fehlner ................... F24S 10/45
126/636
(Continued)

FOREIGN PATENT DOCUMENTS

CN      101481899 A     7/2009
CN      201443035 U     4/2010
(Continued)

OTHER PUBLICATIONS

"Why Wikipedia is not so great", https://en.wikipedia.org/wiki/Wikipedia:Why_Wikipedia_is_not_so_great, retrieved Oct. 10, 2024 (Year: 2024).*

(Continued)

*Primary Examiner* — Edelmira Bosques
*Assistant Examiner* — Deepak A Deean
(74) *Attorney, Agent, or Firm* — Muncy, Geissler, Olds & Lowe, P.C.

(57) ABSTRACT

The invention provides a light-concentrating anti-frost anti-heave heat gathering device and subgrade thereof. The device comprises a light concentrator mounted outside a subgrade; and a heat gathering tube comprising a heat absorption section and a heat release section in communication, the heat absorption section is inserted inside the light concentrator for transferring absorbed heat to the heat release section, the heat release section is inserted inside the subgrade for heating the subgrade, the light concentrator is configured to focus sunlight to and heat the heat absorption section. The heat gathering device herein takes advantage of solar energy resources, by smoothly heating the ground temperature field of the subgrade, and regulating the frost-heaving portions of the subgrade, balanced and smooth heating of the subgrade can be achieved and engineering diseases such as frost heave and uneven fluctuation of the (Continued)

subgrade in the seasonally frozen ground region can be effectively avoided.

17 Claims, 5 Drawing Sheets

(51) Int. Cl.
  *E02D 27/35* (2006.01)
  *F24S 23/30* (2018.01)
  *G02B 19/00* (2006.01)

(52) U.S. Cl.
  CPC ..... *G02B 19/0009* (2013.01); *G02B 19/0042* (2013.01); *E02D 27/35* (2013.01)

(56) References Cited

U.S. PATENT DOCUMENTS

| | | | | |
|---|---|---|---|---|
| 4,228,789 A * | 10/1980 | Kay | ................... | H01L 31/0547 |
| | | | | 136/246 |
| 4,373,573 A * | 2/1983 | Madwed | ............. | F28D 20/0052 |
| | | | | 165/45 |
| 4,444,249 A * | 4/1984 | Cady | ...................... | F24D 15/00 |
| | | | | 165/104.11 |
| 5,233,971 A * | 8/1993 | Hanley | ................... | F24S 90/00 |
| | | | | 126/633 |
| 9,115,915 B2 * | 8/2015 | Lu | .......................... | H02S 20/00 |
| 2014/0182579 A1 * | 7/2014 | Allen | ...................... | F24S 10/45 |
| | | | | 126/652 |
| 2021/0341651 A1 * | 11/2021 | Newman | ................. | F24S 10/70 |
| 2022/0196999 A1 * | 6/2022 | Newman | ................. | F24S 10/70 |

FOREIGN PATENT DOCUMENTS

| | | |
|---|---|---|
| CN | 103062826 A | 4/2013 |
| CN | 104596122 A | 5/2015 |
| CN | 206204718 U | 5/2017 |
| CN | 108224804 A | 6/2018 |
| CN | 108316081 A | 7/2018 |
| CN | 108375212 A | 8/2018 |
| CN | 109577126 A | 4/2019 |
| CN | 110241672 A | 9/2019 |
| JP | 2017015364 A | 1/2017 |

OTHER PUBLICATIONS

"Citing Wikipedia", https://en.wikipedia.org/wiki/Wikipedia:Citing_Wikipedia , retrieved Oct. 10, 2024 (Year: 2024).*
"Wikipedia is not a reliable source", https://en.wikipedia.org/wiki/Wikipedia:Wikipedia_is_not_a_reliable_source, retrieved Oct. 10, 2024 (Year: 2024).*
Subgrade Definition, https://www.merriam-webster.com/dictionary/subgrade , retrieved Oct. 10, 2024 (Year: 2024).*
Liu et al., "Introduction To Renewable Energy," China Light Industry Press Ltd., Feb. 28, 2014, 12 pages.

* cited by examiner

LIGHT-CONCENTRATING ANTI-FROST ANTI-HEAVE HEAT GATHERING DEVICE AND SUBGRADE THEREOF

CROSS-REFERENCE TO RELATED APPLICATIONS

This non-provisional application claims priority under 35 U.S.C. § 119(a) on Patent Applications No. 202110321517.0 filed on Mar. 25, 2021, in P.R. China, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The present invention relates to the technical field of engineering construction in a seasonally frozen ground region, and particularly to a light-concentrating anti-frost anti-heave heat gathering device and subgrade thereof.

BACKGROUND

Xining to Golmud section of Qinghai-Tibet Railway is at the northeast of Qinghai-Tibet Plateau in China, and railway goes across coastal plains, alluvial plains, and ice platforms at the north of Qinghai Lake, where an average altitude is 3220 m, annual mean precipitation is 376 mm, the precipitation is unevenly distributed and most concentrated in July to September, an annual average temperature is $-0.6°$ C., and an average temperature in the coldest month January is $-20.6°$ C. In the Xining to Golmud section of Qinghai-Tibet Railway, the weather is cold, a freezing capacity of temperature is strong, the freezing depth is large, and the maximum freezing depth may reach 1.8 m, which belongs to a typical seasonal frozen soil region. Accordingly, engineering diseases such as frozen heave and thaw collapse of the subgrade caused by freezing and melting are relatively severe.

Recently, due to continuous increase of precipitation at Qinghai-Tibet Plateau, causing enrichment of underground water and rising of the water table, as well as the intensification of climate and environmental change, the engineering disease of freeze-thaw in such region is further increased, resulting in an important influence on the long-term stability of the subgrade. Although the previous study is made on diseases of the subgrade under of engineering in the seasonally frozen ground region, the study is mainly directed to issues such as action and influence of minor frozen heave engineering of the subgrade under working conditions of highway engineering or high-speed railway in regions such as northeast and northwest in China. However, there is still a lack of research on the development characteristics features and distribution laws of engineering disease of freeze-thaw under special conditions such as a high water level, coarse filling and strong freeze-thaw at Xining to Golmud section of Qinghai-Tibet Railway. Application of methods such as replacement of coarse particles, chemical grouting and waterproof curtain used in the common regions is difficult to satisfy requirements of actual engineering in such region, due to limitations of engineering conditions such as normal driving of trains without interruption of construction, and crack at processing parts and extreme difficulty in the overall enclosure at a lower part of the subgrade caused by strong action of soil freezing and thawing.

SUMMARY

An object of the invention includes providing a light-concentrating anti-frost anti-heave heat gathering device and subgrade thereof, which can take advantage of solar energy resources, by smoothly heating the ground temperature field of the subgrade and regulating frost-heaving portions in the subgrade, balanced and smooth heating of the subgrade can be achieved and engineering diseases such as frost heave and uneven fluctuation of the subgrade in the seasonally frozen ground region can be effectively avoided.

The embodiment of the invention can be implemented by:

In a first aspect, the invention provides a light-concentrating anti-frost anti-heave heat gathering device, comprising:
  a light concentrator mounted outside a subgrade; and
  a heat gathering tube comprising a heat absorption section and a heat release section in communication, wherein the light concentrator is configured to focus sunlight to the heat absorption section to heat the heat absorption section, the heat absorption section is inserted inside the light concentrator for further transferring absorbed heat to the heat release section, and the heat release section is inserted inside the subgrade for heating the subgrade.

In such a way, the light concentrator focuses sunlight to the heat absorption section to heat the heat absorption section, the heat release section is inserted into the subgrade, heat absorbed by the heat absorption section of the heat gathering tube is transferred to the heat release section, and the heat release section heats the subgrade, such that the subgrade is always in net heat absorption, and heat is continuously accumulated inside the subgrade, thereby realizing balanced and smooth heating of the subgrade, and reaching objects of preventing engineering diseases such as frozen heave and uneven fluctuation of the subgrade in the seasonally frozen ground region.

In an optional embodiment, the light concentrator comprises:
  a side frame disposed around the heat absorption section; and
  a light condensing cover plate connected to a top of the side frames, the light condensing cover plate has a zigzag shape and configured for focusing sunlight to the heat absorption section.

In such a way, a light concentrator with simple structural form and high stability is possible and can be better suitable for the harsh wild environment.

In an optional embodiment, the light condensing cover plate comprises:
  a shell made of a transmissive material and has a zigzag shape; and
  condenser lenses mounted on an inner side of the shell for focusing sunlight to the heat absorption section.

In such a way, sunlight is focused on the heat absorption section using the condenser lenses. The technology is mature, the cost is low, and heat gathering efficiency is high.

In an optional embodiment, the shell comprises top walls connected sequentially, two adjacent top walls are at a preset angle, the condenser lenses are mounted on the shell such that adjacent condenser lenses are separated by one top wall, and an angle ∠c of the condenser lens upward lifting with respect to a horizontal plane is within a range of 30° to 60°.

In such a way, in winter, an incident surface of the condenser lens is substantially perpendicular to an incident direction of sunlight, such that it is possible to maximize the receiving of sunlight by a condenser lens, thereby increasing the intensity of sunlight focused by the condenser lens, and improving heating efficiency of the heat absorption section.

In an optional embodiment, a length direction of each of the condenser lenses is perpendicular to a length direction of the heat absorption section, and a plurality of the condenser lenses are sequentially arranged along the length direction of the heat absorption section.

In such a way, a required length of the condenser lenses is small, and the plurality of the condenser lenses sequentially arranged along the length direction of the heat absorption section can efficiently heat positions on the entire length of the heat absorption section.

In an optional embodiment, the heat gathering tube further comprises a transition section connected between the heat absorption section and the heat release section, a length direction of the heat absorption section is inclined downwardly with respect to a horizontal plane by an angle range of 0° to 30°, a length direction of the transition section is parallel to a slope of the subgrade, and a length direction of the heat release section is inclined upwardly with respect to the horizontal plane by an angle range of 0° to 30°.

In such a way, as for a wide subgrade, the heat release section needs to be inserted deeper into the subgrade. It is more convenient to mount the heat gathering tubes in the subgrade, a drilling depth is small, and the required number of the drilling is few, and the original engineering structure of the subgrade is not changed, thereby ensuring the stability of the original subgrade, having no influence on normal driving of trains during construction, and effectively solving difficulties in engineering construction when satisfying the condition of driving of the trains.

In an optional embodiment, a length direction of the heat release section is parallel to a slope of the subgrade.

In such a way, as for a narrow subgrade, the heat release section is inserted shallower into the subgrade, and the heat release section can be shallowly buried into the slope of the subgrade without changing the original engineering structure of the subgrade, thereby ensuring the stability of the original subgrade, having no influence on normal driving of trains during construction, and effectively solving difficulties in engineering construction when satisfying the condition of driving of the trains.

In an optional embodiment, the light-concentrating anti-frost anti-heave heat gathering device further comprises:
  a base mounted inside the light concentrator, located at a bottom of the heat absorption section, and provided with a groove, and a surface of the groove is formed as a reflecting surface that reflects sunlight to the heat absorption section.

In such a way, not only the light concentrator focuses sunlight on the heat absorption section, but also the reflecting surface on the base can further reflect sunlight to the heat absorption section, thereby improving the heating efficiency of the heat absorption section.

In a second aspect, the invention provides a light-concentrating anti-frost anti-heave heat gathering subgrade, comprising a subgrade and the light-concentrating anti-frost anti-heave heat gathering device according to any of the embodiments, wherein the light concentrator is mounted outside the subgrade, and the heat release section is inserted inside the subgrade.

In such a way, the light-concentrating anti-frost anti-heave heat gathering device can take advantage of solar energy resources, by smoothly heating the ground temperature field of the subgrade and regulating the frost-heaving portions in the subgrade, balanced and smooth heating of the subgrade can be achieved and engineering diseases such as frost heave and uneven fluctuation of the subgrade in the seasonally frozen ground region can be effectively avoided.

In an optional embodiment, the light-concentrating anti-frost anti-heave heat gathering subgrade further comprises a heat preservation material layer disposed on a slope of the subgrade.

In such a way, the heat preservation material layer can prevent heat loss inside the subgrade, and effectively ensures reservation of heat inside the subgrade in the process of day-night change.

BRIEF DESCRIPTION OF THE DRAWINGS

To clearly explain the technical solution in the embodiment of the invention, hereinafter the desired accompanying drawings in the embodiment are simply introduced. It shall be understood that hereinafter the drawings only illustrate some examples of the invention, so it shall not be viewed as a definition to the scope. As for those ordinaries in the art, on the premise of making no creative work, other relevant drawings also can be obtained based on these drawings.

DETAILED DESCRIPTION

Figure 1:
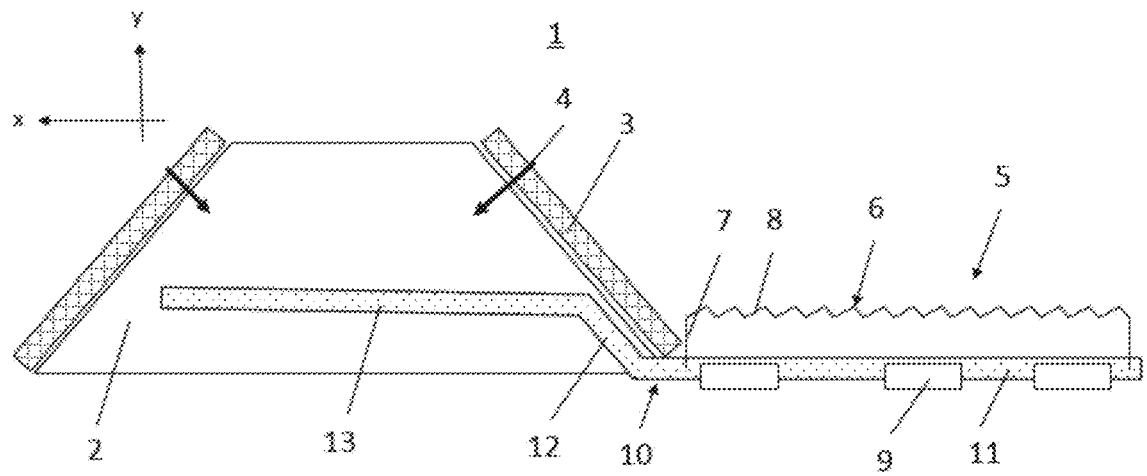
FIG. 1 is a structural view of a light-concentrating anti-frost anti-heave heat gathering subgrade provided in one embodiment of the invention.

To make objects, technical solutions, and advantages of the embodiments of the invention clearer, hereinafter the technical solution in the embodiments of the invention is clearly and completely described with reference to the drawings in the embodiments of the invention. Obviously, the described embodiments are a part of the embodiments of the invention, not all embodiments. Generally, components in the embodiments of the invention described and illustrated in the drawings can be arranged and designed in various different configurations.

Therefore, detailed descriptions of the embodiments of the invention provided in the drawings do not aim to limit the scope protected by the invention, but only represent the selected embodiments of the invention. Based on the embodiments in the invention, on the premise of making no creative work, all other embodiments obtained by those ordinaries in the art belong to the scope protected by the invention.

It shall be noticed that similar reference signs and letters represent similar items in the drawings, so once one item is defined in one drawing, it is unnecessary to make further definition and explanation in subsequent drawings.

In the descriptions of the invention, it shall be noted that if orientation or positional relation indicated by terms "up", "down", "in" and "out" is orientation or positional relation illustrated based on the drawings, or commonly placed orientation or positional relation when the invention products are used, it is only to facilitate describing the invention and simplifying the descriptions, not indicating or suggesting that the device or element must have a specific orientation, and is constructed and operated in a specific orientation, so the invention is not limited thereto.

It shall be noted that in the case of not conflicting, features in the embodiments of the invention can be combined with each other.

Since previous research on engineering measures for treating such engineering diseases is weak, engineering issues affect the stability and operating security of the subgrade for a long time. The embodiment of the invention is just proposed against the key scientific issue, starting from "temperature of the subgrade" in three indispensable factors "water, soil, and temperature" produced by frozen heave of the subgrade, thereby reaching objects of controlling the temperature and preventing the frozen heave of the subgrade through the device provided in the embodiments of the invention.

Figure 2:
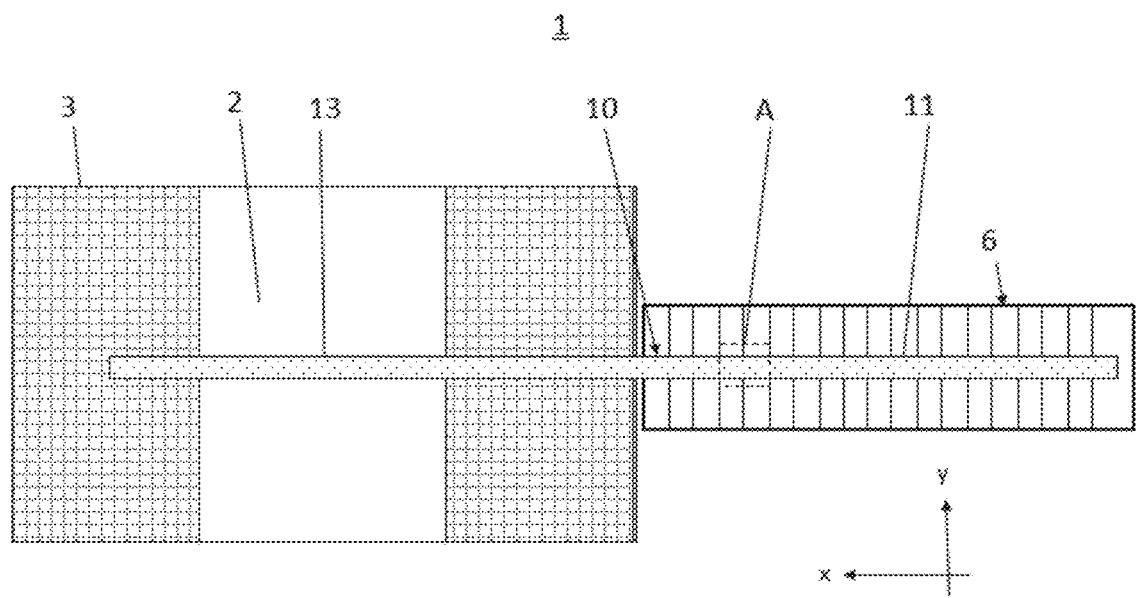
FIG. 2 is a top view of the structure in FIG. 1.
Figure 3:
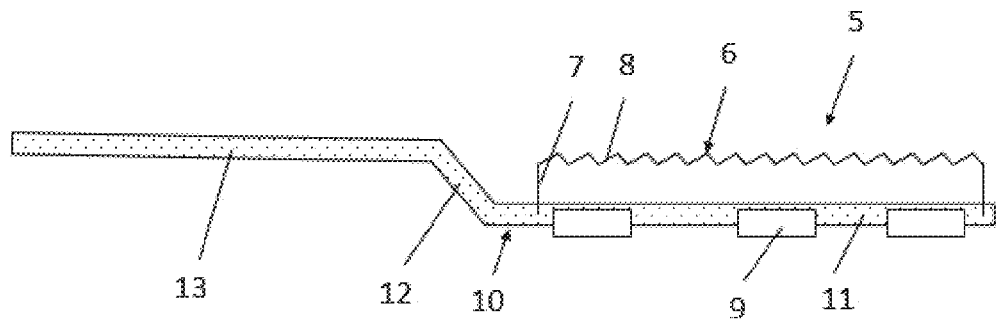
FIG. 3 is a structural view of a light-concentrating anti-frost anti-heave heat gathering device in FIG. 1.

Referring to FIGS. 1 and 2, this embodiment provides a light-concentrating anti-frost anti-heave heat gathering subgrade 1, comprising a subgrade 2, a light-concentrating anti-frost anti-heave heat gathering device 5, and a heat preservation material layer 3.

Specifically, referring to FIGS. 1 to 4, the light-concentrating anti-frost anti-heave heat gathering device 5 comprises a light concentrator 6, a heat gathering tube 10, and a base 9. The light concentrator 6 is mounted in a sunny region external of subgrade 2 and comprises a side frame 7 and a light condensing cover plate 8 connected to a top of the side frame, and the light condensing cover plate 8 has a zigzag shape. The heat gathering tube 10 comprises a heat absorption section 11, a transition section 12, and a heat release section 13 sequentially in communication, wherein the heat absorption section 11 is inserted inside the light concentrator 6, and forms a sealed chamber with the light concentrator 6. The heat release section 13 is inserted inside the subgrade 2 at a position within a range from a foot to a half of the slope of the subgrade 2, the length of the heat release section 13 is across most of the width of the subgrade 2, and a height position of the heat release section 13 is substantially at a middle lower position of the subgrade 2. The light condensing cover plate 8 is configured to focus sunlight to the heat absorption section 11 to heat the heat absorption section 11, the heat absorption section 11 is further configured to transfer absorbed heat to the heat release section 13, and the heat release section 13 is configured to heat the subgrade 2, such that the subgrade 2 is always in net heat absorption, and heat is continuously accumulated inside the subgrade, thereby realizing balanced and smooth heating of the subgrade 2, and reaching objects of preventing engineering diseases such as frozen heave and uneven fluctuation of the subgrade 2 in the seasonally frozen ground region.

Specifically, the length direction of the heat absorption section 11 inclined downwardly with respect to a horizontal plane by an angle range of 0° to 30°, in particular, 10°. In other words, as shown in FIG. 1, the length of the heat absorption section 11 extends along a direction x and downwardly inclines along a direction y by an angle of 10°. The length direction of the transition section 12 is parallel to a slope of subgrade 2. The length direction of the heat release section 13 is inclined upwardly with respect to the horizontal plane by an angle range of 0° to 30°, in particular, 10°. In other words, as shown in FIG. 1, the length of the heat release section 13 extends along the direction x and upwardly inclines along the direction y by an angle of 10°. In such a way, the heat release section 13 is inserted in a nearly horizontal direction and is nearly horizontal in the subgrade 2. By arranging a large number of the heat gathering tubes 10 in parallel at a certain distance, ground temperature isolines can be ensured to be rapidly developed horizontally during temperature rising of the subgrade 2, thereby effectively improving the process of intercoupling action between water and heat inside the subgrade, and further enhancing the stability of the subgrade 2.

Figure 4:
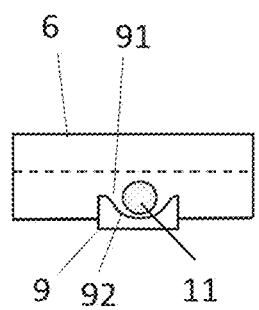
FIG. 4 is a right view of the structure in FIG. 3.
Figure 5:
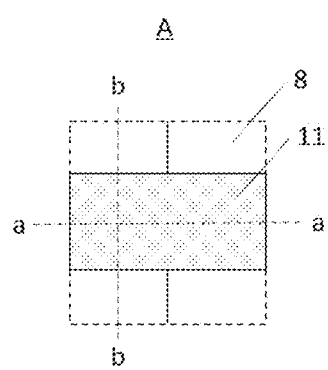
FIG. 5 is an enlarged view of a local part A in FIG. 2.

Referring to FIG. 4, the base 9 is mounted inside the light concentrator 6 and is located at a bottom of the heat absorption section 11, in particular, on the ground, the base 9 supports the heat absorption section 11. The base 9 is provided with a groove 91, and a surface of the groove 91 is formed as a reflecting surface 92 which reflects sunlight to the heat absorption section 11. In such a way, not only the light concentrator 6 focuses sunlight on the heat absorption section 11, but also the reflecting surface 92 on the base 9 can further reflect sunlight to the heat absorption section 11, thereby improving the heating efficiency of the heat absorption section 11.

The heat preservation material layer 3 is disposed on a slope of the subgrade 2, can cover the entire slope of the subgrade 2, and is fixed by an anchor rod 4. In other embodiments, the heat preservation material layer 3 also can be compacted and fixed by covering a thin layer of soil or other material on an outer surface of the heat preservation material layer 3. The heat preservation material layer 3 can select building rock wool heat preservation material or an integrated heat preservation plate. Specifically, both a sunny slope and a shady slope of the subgrade 2 can be provided with the heat preservation material layer 3, thereby preventing heat loss inside the subgrade 2, and effectively ensuring the reservation of heat inside the subgrade 2 during day-night change.

Figure 6:
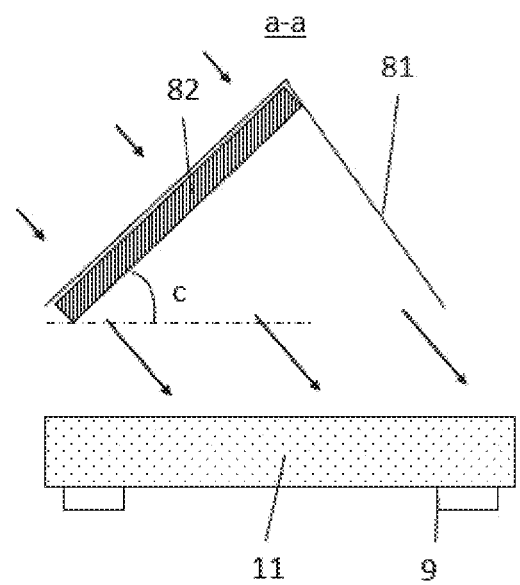
FIG. 6 is a sectional view along a sectional line a-a of the structure in FIG. 5.

Referring to FIGS. 2 and 5-7, arrows represent an irradiation direction of sunlight. The light condensing cover plate 8 comprises a shell 81 and condenser lenses 82. The condenser lenses 82 can be convex lenses, and also can be Fresnel lenses. The shell 81 is made of a transmissive material and has a zigzag shape. The shell 81 comprises plurality of top walls connected sequentially, every two adjacent top walls are at a preset angle, and the plurality of condenser lenses 82 are mounted on the shell 81 such that adjacent condenser lenses are separated by one top wall. Moreover, the condenser lenses 82 are mounted on the inner sides of the top walls, which can function to protect the condenser lenses 82. Referring to FIG. 6, an angle ∠c of the condenser lens 82 upward lifting with respect to a horizontal plane is within a range of 30° to 60°, and the angle shall be adjusted depending on specific locations in winter. In such a way, an incident surface of the condenser lens 82 is substantially perpendicular to an incident direction of sunlight, which can allow the condenser lens 82 to receive sunlight to the maximum, thereby increasing the intensity of sunlight focused by the condenser lens 82, and improving heating efficiency of the heat absorption section 11.

Figure 7:
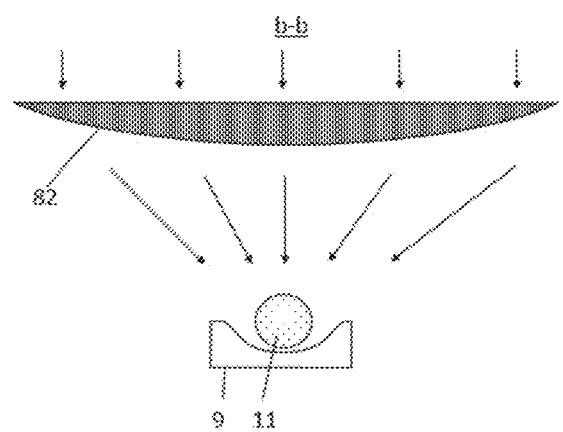
FIG. 7 is a sectional view along a sectional line b-b of the structure in FIG. 5.

Referring to FIG. 7, heat absorption section 11 is located at focus of the condenser lens 82, or the height of the condenser lens 82 is controlled to be the focal length of the condenser lens 82, such that the heat absorption section 11 is located at the focus of the condenser lens 82.

The condenser lens 82 focuses sunlight from two sides to a center line position, and directly heats the heat absorption section 11 by light focusing and heat gathering. The bases 9 at the bottom of the heat absorption section 11 reflect sunlight to the heat absorption section 11 simultaneously, thereby improving heating the efficiency of the heat absorption section 11.

Referring to FIG. 2, a length direction of each of the condenser lenses 82 is perpendicular to a length direction of the heat absorption section 11, and a plurality of the condenser lenses 82 are sequentially arranged along the length direction of the heat absorption section 11. In other words, a length direction of each of the condenser lenses 82 is parallel to the direction y, and the plurality of the condenser lenses 82 are arranged sequentially along the direction x. In such a way, the required length of the condenser lenses 82 is small, and the plurality of the condenser lenses 82 are arranged sequentially along the length direction of the heat absorption section 11, which can effectively heat positions on the entire length of the heat absorption section 11.

The light condensing cover plate 8 in this embodiment mainly adopts a form in which a series of convex lenses with good light focusing performance and high light focusing efficiency are arranged in parallel, and convex lenses are firmly combined together through the shell 81, which improves stability and weather resistance in the wild harsh environment, and better facilitates circulating process under the unpowered condition of the whole device since the light concentrator 6 is at a relatively low position in the whole device.

It shall be noted that according to actual site conditions and the requirement for heating the subgrade 2, the light concentrator 6 may be placed at one side of a sunny slope or one side of a shady slope, and also may be laid on both sides of the subgrade 2.

Figure 8:
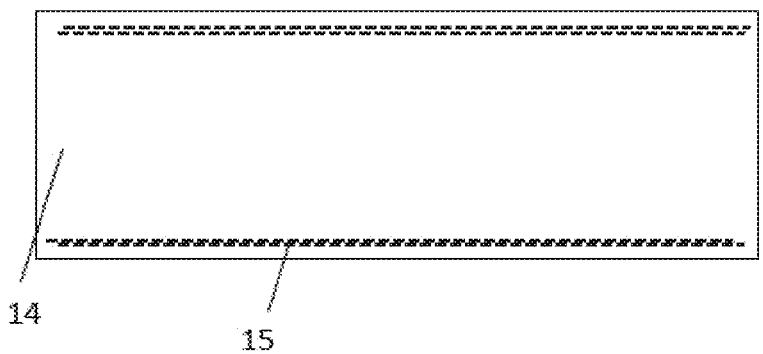
FIG. 8 is a sectional view of a heat gathering tube.
Figure 9:
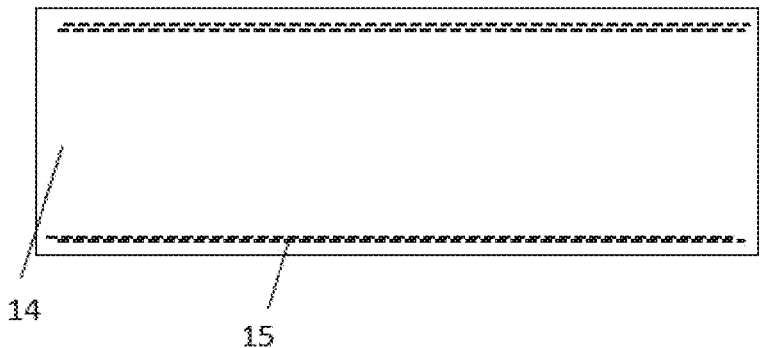
FIG. 9 is a left view of the structure in FIG. 5.

Referring to FIGS. 8 and 9, the heat gathering tube 10 comprises a tube body 14, liquid absorbing cores 15 disposed on an inner wall of the tube body 14, and a phase change working medium (not illustrated) filled inside the tube body 14. In such a way, the liquid state phase change working medium inside the heat absorption section 11 is converted into a vapor state by absorbing heat from the light concentrator 6 and the base 9 and moved to the heat release section 13 under air pressure, and the vapor state phase change working medium in the heat release section 13 is condensed into a liquid state and releases heat. Meanwhile, the liquid state phase change working medium is immerged into the liquid absorbing cores 15 to produce capillary force, such that the phase change working mediums are absorbed on all walls of the tube body 14 under the action of the capillary force, and the phase change working mediums on all wall surfaces are vaporized under working conditions. Since a vaporized surface is multiplied in an evaporation area as compared to those having no liquid absorbing cores 15, the evaporation and the amount of vapor state working mediums are multiplied, such that working efficiency of the whole heat gathering tube 10 is multiplied, while urging the phase change working mediums to smoothly flow back from the heat release section 13 to the heat absorption section 11 through the action of the capillary force. To incase a flow rate of the phase change working mediums from the heat release section 13 back to the heat absorption section 11 in the tube body 14, multiple layers of liquid absorbing cores 15 can be set. In such circulation, the heat gathering tubes 10 continuously transfer heat energy absorbed by the heat absorption section 11 efficiently to the heat release section 13 inside the subgrade 2 to heat soil around the heat gathering tubes 10.

Moreover, due to laying of the liquid absorbing cores 15 inside the heat gathering tubes 10, and a certain height difference between the heat absorption section 11 and the heat release section 13, under the action of gravity and capillary force, the effect of horizontal heat tubes is easily achieved, and efficient transfer of heat in a horizontal direction is possible, thereby realizing unpowered efficient heat transfer of the entire device.

Figure 10:
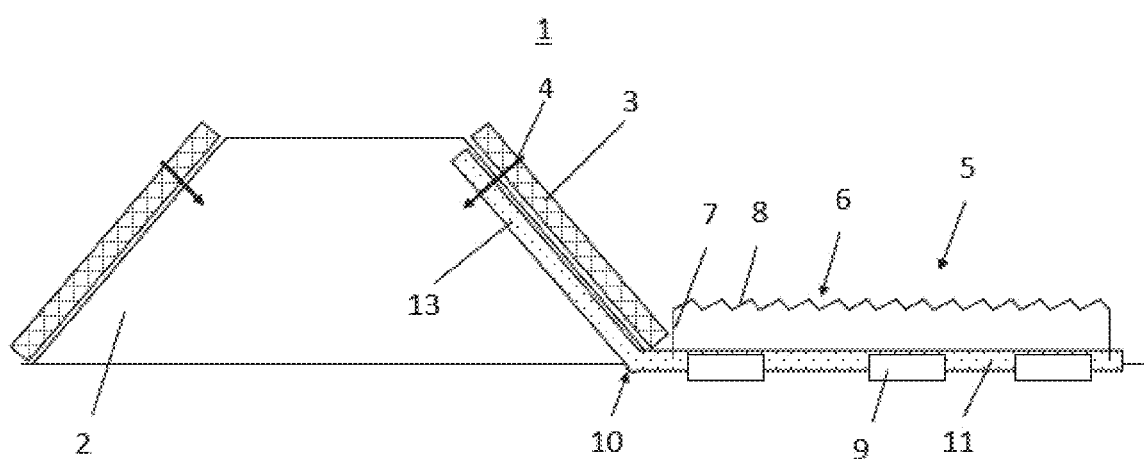
FIG. 10 is a structural view of another light-concentrating anti-frost anti-heave heat gathering subgrade provided in one embodiment of the invention.

In addition to a "Z" shape, the heat gathering tubes 10 provided in this embodiment, referring to FIG. 10, also can use a broken line shape. In other words, the heat absorption section 11 and the heat release section 13 of the heat gathering tube 10 are at a certain angle, such that the heat absorption section 11 can be held to be substantially horizontal, thereby facilitating arrangement of the heat absorption section 11, and the heat release section 13 also can extend into a region to be heated most in the subgrade 2. For example, the heat release section 13 can be laid in parallel to a slope of the subgrade 2, and heat the subgrade 2 through heat transfer. As for a higher subgrade 2, the plurality of heat gathering tubes 10 also can be laid along the slope of the subgrade 2.

In actual application, the heat gathering tube, the heat preservation material layer, and the light concentrator can be flexibly set and combined, such as, adjusting an embedded angle and interval of the heat gathering tube, disposing the heat preservation material layer on one side or both sides, even adding one auxiliary heat preservation layer, and the like, according to engineering conditions such as direction and height of the subgrade, and actual situations such as solar radiation and environmental conditions around the sites, thereby adjusting a temperature rising strength and an action region of a ground temperature field of the subgrade, and achieving an optimal ground temperature regulating effect.

The light-concentrating anti-frost anti-heave heat gathering device and subgrade thereof provided in this embodiment can be mainly applied to China western seasonal frozen soil regions, take full advantage of rich solar energy resources in China western regions, and realize balanced ground temperature regulation of the subgrade through smooth heating of the ground temperature field of the subgrade and regulation of frost-heaving portions in the subgrade, and maintain a positive temperature of the subgrade all year round, thereby effectively avoiding engineering diseases such as frost heave and uneven fluctuation of the subgrade in the seasonally frozen ground region.

As compared to the existing engineering technology, the light-concentrating anti-frost anti-heave heat gathering device and subgrade thereof provided in this embodiment at least have the following advantages.

1. As compared to the existing grouting engineering technology, in the light-concentrating anti-frost anti-heave heat gathering device and subgrade thereof provided in this embodiment, firstly, the heat gathering tube extends inside the subgrade from the lower part of the subgrade in a substantially horizontal direction, mainly covers most of regions at bottom of the subgrade, and as compared to drilling holes vertically downward in the existing grouting engineering, the number of drilling holes and a depth of the drilling holes can be reduced; secondly, the existing grouting engineering changes the engineering structure of the subgrade, while this embodiment is mainly to regulate ground temperatures for changing thermal properties of the subgrade, and mainly functions on regions in the subgrade where moisture is enriched and volume expansion occurs after frost heave, while not changing the original engineering structure of the subgrade; finally, the existing grouting engineering does not use the heat preservation material layer, while in this embodiment, the heat preservation material layer can prevent heat loss inside the subgrade, and effectively ensure reservation of heat inside the subgrade in the process of day-night change;

2. As compared to the existing electric heating engineering technology, the existing electric heating engineering heats the subgrade through electric heating measures inside the subgrade, needs supply of external power, and requires building and laying of special electric power lines, so large electric power resources are consumed every year, and when the internal electronic electric heating system has fault under wild use conditions, cost of operation and maintenance is large. However, the light-concentrating anti-frost anti-heave heat gathering device and subgrade thereof provided in this embodiment do not need an external power source, and circulate automatically, and realize the object of heating the subgrade by taking full advantage of local rich solar energy resources, so they save energy sources, and are green and environmental protective.

To sum up, as compared to the existing engineering technology, the light-concentrating anti-frost anti-heave heat gathering device and subgrade thereof provided in this embodiment have notable progress and control freeze-thaw key elements in diseases of the subgrade in the seasonally frozen ground region, thereby obtaining a multiplier effect with half the effort. The unpowered anti-frost anti-heave heat gathering device and subgrade thereof provided in this embodiment also realizes horizontal, balanced, and symmetrical distribution of ground temperature isolines of the subgrade, eliminating influence on a difference of thermodynamic coupling of the subgrade, and further enhancing the stability of a mechanical field of the subgrade. These effectively avoid engineering diseases such as uneven frost heave and longitudinal crack of the subgrade, in particular, the wide subgrade, and ensure long-term stability of the subgrade, so the embodiment of the invention has outstanding scientificity and advancement.

In an aspect of construction, this embodiment solves difficulties in existing engineering construction. Construction position in this embodiment is at one side or both sides of the subgrade, and construction method is drilling holes horizontally. Point construction is carried out on the subgrade, a speed of filling and drilling in the subgrade is fast, and a diameter of the holes is small, so the stability of the subgrade is not affected. Moreover, during construction, it is only to drill holes and insert into holes, while having no measures such as grouting and replacement, so it won't produce disturbance in a large range and change of mechanical properties to the subgrade, thereby further ensuring the stability of the original subgrade. The construction process does not constitute influence on normal driving of the trains and reaches the requirements for engineering construction under the condition of driving of the trains.

The light concentrator 6 is arranged in series with a suitable height, and a low, wide, and large form, which increases the stability of the whole device in China western strong wind and harsh environment. Moreover, lowering of a center of gravity of the heating units helps formation and increase of a pushing force in the entire thermal circulation of the device, and ensures smooth and efficient working during the whole circulation and heat transfer.

To verify regulation efficiency of the light-concentrating anti-frost anti-heave heat gathering device and subgrade thereof provided in the embodiments of the invention, numerical modeling, and simulation calculation under the action of engineering measures are performed combined with geological conditions of the test engineering sites of Qinghai-Tibet Railway from Xining to Golmud in China.

Example: at one side of a shady slope of the subgrade for Qinghai-Tibet Railway with a height of 2.0 m and a top width of 7.5 m, the heat gathering tubes are substantially horizontally inserted inside the subgrade at a height of 0.5 m, the heat release section has a length of 8 m, and an interval of the heat gathering tubes along a length direction of the subgrade is 2 m. In the heating system, heating power is 900 W with reference to the heating power of the existing 1 m$^2$ solar water heater in such region, working time is from 10 am to 4 pm in the daytime, and a heat transfer power is discounted and calculated by 50%. To further verify the effectiveness of such measures in adverse conditions, the heat preservation material layer 8 is not laid on the slope of the subgrade in simulation calculation.

Figure 11:
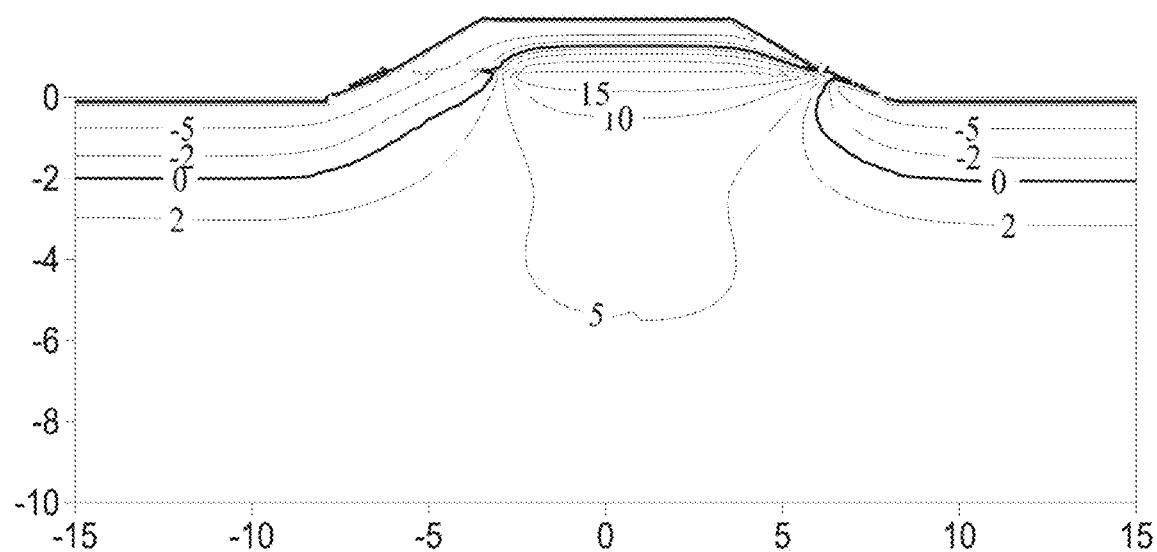
FIG. 11 is a schematic view of a ground temperature field of stimulation calculating results after the subgrade is laid with heat gathering tubes for thirty days.

Under such working conditions, the heat gathering tubes were set on December 15, and on January 15 of this Winter, a ground temperature field of simulation calculating results after the heat gathering tubes were laid for 30 days is shown in FIG. 11. FIG. 11 is a ground temperature profile of the subgrade at 8:30 am on the 30$^{th}$ day with a condition of the lowest external environmental temperature, in which the subgrade performs heat dissipation for one night. As can be seen, (a) in an aspect of features of ground temperature values, the ground temperatures in most regions of the subgrade are positive, and the ground temperatures at positions of a supporting layer and having higher moisture of the lower part of the subgrade are in a relatively high temperature region, wherein the maximum temperature may reach 18° C.; (b) in an aspect of characteristics of morphology of the ground temperature field, the ground temperature isolines represent horizontal and parallel morphological characteristics as a whole. In particular, the 0° C. isothermal line is distributed flat, i.e., the frozen zone and the positive temperature zone are in parallel to each other. The frozen zone is only distributed at an upper part of the subgrade with a thin layer, and the distribution is even and symmetrical, so engineering difficulties of the frozen soil can be effectively solved, and details are as follows.

(1) It improves the temperature state of the temperature field in a center region of the original subgrade, and satisfies the requirements for regulation of the temperature field of the railway subgrade in the seasonally frozen ground region. As can be seen from FIG. 11, after implementation of this embodiment, the ground temperatures in the center region and the main supporting layer of the subgrade are positive, and positive temperature and high temperature soil cores are formed in the center of the subgrade. Moreover, since this part of the soil body is characterized by high moisture content, a large thermal capacity, and more gathered heat, the capability of anti-frost anti-heave of the subgrade is improved when the external environmental temperature is reduced.

(2) Distribution of 0° C. ground temperature isoline and other isothermal lines in the temperature field is completely horizontal and flat, and distribution of thin lines in the frozen zone is at a top of the subgrade and close to a revetment, which largely improves the stability of the subgrade. As can be seen from FIG. 11, the temperature field of the subgrade is distributed flat, in particular, 0° C. isothermal line, and is convex upwardly as a whole in the subgrade, thereby facilitating discharging of water in the subgrade and significantly reducing frost heave amount of the subgrade at a stage where atmospheric precipitation and freeze-thawing are frequently alternated in early spring.

(3) It eliminates the influence of shady-sunny slope effect, and substantially eliminates engineering disease of the longitudinal crack in the subgrade. As can be seen from FIG. 11, the temperature field of the subgrade beneath the pavement is substantially distributed symmetrically around a center of the subgrade, and the isothermal lines in the temperature field of the subgrade are distributed flat, as well as distribution of the frozen zone only at a top of the subgrade and a thin strip region under the revetment, which further weakens less transverse differential frost heave amount produced at a part of frozen positions, and further eliminates possibility of the longitudinal crack of the subgrade.

This embodiment is only for representative analyses for the invention, and the conclusion substantially represents the effects to be achieved by the invention in tendency (different in specific values).

In addition, simulation calculation shows that when the railway is built in the seasonally frozen ground region according to the structure provided in this embodiment, the subgrade always stores heat energy during operation, and the frozen zone in the subgrade is reduced along with operating time, so the structure can satisfy the desired requirements for mechanical stability of the subgrade and may sustain long-term stability of the subgrade.

The above disclosures are only detailed embodiments of the invention, but the protection scope of the invention is not limited thereto. Easily conceivable change or substitution for any skilled in the art within the technical range disclosed by the invention shall be covered within the protection scope of the invention. Therefore, the protection scope of the invention shall be subjected to the scope protected by the appended claims.

What is claimed is:

1. An unpowered light-concentrating anti-frost anti-heave heat gathering device used in seasonal frozen soil region, comprising:
   a light concentrator mounted outside a subgrade of highway or railway;
   a heat gathering tube comprising a heat absorption section, a transition section and a heat release section sequentially in communication, wherein
   the light concentrator is configured to focus sunlight to the heat absorption section to heat the heat absorption section,
   the heat absorption section is inserted inside the light concentrator for further transferring absorbed heat to the heat release section,
   the heat release section is inserted inside the subgrade for heating the subgrade,
   the heat gathering tube comprises a tube body, liquid absorbing cores disposed on an inner wall of the tube body, and a phase change working medium filled inside the tube body, the phase change working medium absorbs heat and releases heat by transitioning between liquid and vapor states, and
   a length direction of the transition section is parallel to a slope of the subgrade, and there is a height difference between the heat absorption section and the heat release section, so that the heat absorption section lower than the heat protection section.

2. The light-concentrating anti-frost anti-heave heat gathering device according to claim 1, wherein the light concentrator comprises:
   a side frame disposed around the heat absorption section; and
   a light condensing cover plate connected to a top of the side frame, the light condensing cover plate has a zigzag shape, and is configured for focusing sunlight to the heat absorption section.

3. The light-concentrating anti-frost anti-heave heat gathering device according to claim 2, wherein the light condensing cover plate (8) comprises:
   a shell made of a transmissive material and having a zigzag shape; and
   a plurality of condenser lenses mounted on an inner side of the shell for focusing sunlight to the heat absorption section.

4. The light-concentrating anti-frost anti-heave heat gathering device according to claim 3, wherein the shell comprises top walls connected sequentially, two adjacent top walls are at a preset angle, the plurality of condenser lenses are mounted on the shell such that adjacent condenser lenses are separated by one top wall, and an angle ∠c of each of the plurality of condenser lens upward lifting with respect to a horizontal plane is within a range of 30° to 60°.

5. The light-concentrating anti-frost anti-heave heat gathering device according to claim 4, wherein a length direction of each of the plurality of condenser lenses is perpendicular to a length direction of the heat absorption section, and the plurality of the condenser lenses are sequentially arranged along the length direction of the heat absorption section.

6. The light-concentrating anti-frost anti-heave heat gathering device according to claim 1, wherein the heat gathering tube further comprises a transition section connected between the heat absorption section and the heat release section, a length direction of the heat absorption section is inclined downwardly with respect to a horizontal plane by an angle range of 0° to 30°, a length direction of the transition section is parallel to a slope of the subgrade, and a length direction of the heat release section is inclined upwardly with respect to the horizontal plane by an angle range of 0° to 30°.

7. The light-concentrating anti-frost anti-heave heat gathering device according to claim 1, wherein a length direction of the heat release section is parallel to a slope of the subgrade.

8. The light-concentrating anti-frost anti-heave heat gathering device according to claim 1, further comprising:
   a base mounted inside the light concentrator, located at a bottom of the heat absorption section, and provided with a groove, and a surface of the groove is formed as a reflecting surface which reflects sunlight to the heat absorption section.

9. A light-concentrating anti-frost anti-heave heat gathering subgrade used in seasonal frozen soil region, comprising:

a subgrade of highway or railway; and an unpowered light-concentrating anti-frost anti-heave heat gathering device, comprising:
- a light concentrator mounted outside the subgrade; and
- a heat gathering tube comprising a heat absorption section, a transition section and a heat release section sequentially in communication, wherein the light concentrator is configured to focus sunlight to the heat absorption section to heat the heat absorption section, the heat absorption section is inserted inside the light concentrator for further transferring absorbed heat to the heat release section, and the heat release section is inserted inside the subgrade for heating the subgrade, wherein the light concentrator is mounted outside the subgrade, and the heat release section is inserted inside the subgrade, wherein the heat gathering tube comprises a tube body, liquid absorbing cores disposed on an inner wall of the tube body, and a phase change working medium filled inside the tube body, the phase change working medium absorbs heat and releases heat by transitioning between liquid and vapor states, and wherein a length direction of the transition section is parallel to a slope of the subgrade, and there is a height difference between the heat absorption section and the heat release section, so that the heat absorption section lower than the heat protection section.

10. The light-concentrating anti-frost anti-heave heat gathering subgrade according to claim 9, wherein the light-concentrating anti-frost anti-heave heat gathering subgrade further comprises a heat preservation material layer disposed on a slope of the subgrade.

11. The light-concentrating anti-frost anti-heave heat gathering subgrade according to claim 9, wherein the light concentrator comprises:
- a side frame disposed around the heat absorption section; and
- a light condensing cover plate connected to a top of the side frame, the light condensing cover plate has a zigzag shape, and is configured for focusing sunlight to the heat absorption section.

12. The light-concentrating anti-frost anti-heave heat gathering subgrade according to claim 11, wherein the light condensing cover plate comprises:

- a shell made of a transmissive material and having a zigzag shape; and
- a plurality of condenser lenses mounted on an inner side of the shell for focusing sunlight to the heat absorption section.

13. The light-concentrating anti-frost anti-heave heat gathering subgrade according to claim 12, wherein the shell comprises top walls connected sequentially, two adjacent top walls are at a preset angle, the plurality of condenser lenses are mounted on the shell such that adjacent condenser lenses are separated by one top wall, and an angle $\angle c$ of each of the plurality of condenser lens (82) upward lifting with respect to a horizontal plane is within a range of 30° to 60°.

14. The light-concentrating anti-frost anti-heave heat gathering subgrade according to claim 13, wherein a length direction of each of the plurality of condenser lenses is perpendicular to a length direction of the heat absorption section, and the plurality of the condenser lenses are sequentially arranged along the length direction of the heat absorption section.

15. The light-concentrating anti-frost anti-heave heat gathering subgrade according to claim 9, wherein the heat gathering tube further comprises a transition section connected between the heat absorption section and the heat release section, a length direction of the heat absorption section is inclined downwardly with respect to a horizontal plane by an angle range of 0° to 30°, a length direction of the transition section is parallel to a slope of the subgrade, and a length direction of the heat release section is inclined upwardly with respect to the horizontal plane by an angle range of 0° to 30°.

16. The light-concentrating anti-frost anti-heave heat gathering subgrade according to claim 9, wherein a length direction of the heat release section is parallel to a slope of the subgrade.

17. The light-concentrating anti-frost anti-heave heat gathering subgrade according to claim 9, further comprising:
- a base mounted inside the light concentrator, located at a bottom of the heat absorption section, and provided with a groove, and a surface of the groove is formed as a reflecting surface which reflects sunlight to the heat absorption section.

\* \* \* \* \*